(12) United States Patent
Zhou et al.

(10) Patent No.: US 10,031,342 B2
(45) Date of Patent: Jul. 24, 2018

(54) HIGH-POWER LASER ATTENUATOR

(71) Applicant: Nanjing Institute of Advanced Laser Technology, Nanjing (CN)

(72) Inventors: Jun Zhou, Nanjing (CN); Qikun Li, Nanjing (CN); Hufu Xiao, Nanjing (CN); Jianyong Ding, Nanjing (CN); Chen Deng, Nanjing (CN); Zhi Li, Nanjing (CN)

(73) Assignee: NANJING INSTITUTE OF ADVANCED LASER TECHNOLOGY, Nanjing (CN)

( * ) Notice: Subject to any disclaimer, the term of this patent is extended or adjusted under 35 U.S.C. 154(b) by 7 days.

(21) Appl. No.: 15/370,728

(22) Filed: Dec. 6, 2016

(65) Prior Publication Data

US 2017/0176760 A1   Jun. 22, 2017

(30) Foreign Application Priority Data

Dec. 17, 2015   (CN) .......................... 2015 1 0955249

(51) Int. Cl.
  *G02B 27/28*   (2006.01)
  *G02B 5/00*   (2006.01)
  *G02B 5/30*   (2006.01)

(52) U.S. Cl.
  CPC ............ *G02B 27/281* (2013.01); *G02B 5/003* (2013.01); *G02B 5/3066* (2013.01); *G02B 27/283* (2013.01)

(58) Field of Classification Search
  None
  See application file for complete search history.

(56) References Cited

U.S. PATENT DOCUMENTS

| 4,200,377 A | * | 4/1980 | Holderbaum | .......... G02B 7/282 |
| | | | | 359/824 |
| 6,356,578 B1 | * | 3/2002 | Yin | ...................... G02B 5/3066 |
| | | | | 372/107 |
| 2014/0285872 A1 | * | 9/2014 | Horikawa | ............... G02F 1/353 |
| | | | | 359/328 |

* cited by examiner

*Primary Examiner* — Jennifer D. Carruth
(74) *Attorney, Agent, or Firm* — CBM Patent Consulting, LLC

(57) ABSTRACT

It relates to a high-power laser attenuator wherein laser is incident into an attenuator housing through a lens barrel; a ½ wave plate, a first lens and a second lens are arranged in sequence on an incident light path along a laser incident direction; the ½ wave plate can rotate around the incident light path, and normal lines of incident planes of the two lenses and the incident light axis are set to form a Brewster angle; a laser absorber assembly is arranged in a reflected light path of the first lens.

8 Claims, 2 Drawing Sheets

HIGH-POWER LASER ATTENUATOR

This application claims priority to Chinese Patent Application Ser. No. CN201510955249.2 filed on Dec. 17, 2015.

TECHNICAL FIELD

The present invention belongs to the technical field of laser, and particularly relates to a laser power attenuation technology, in particular to an attenuator suitable for a laser of high power.

BACKGROUND ART

In a laser application system, laser power can be used or measured generally after attenuated by an attenuator. In prior art, the attenuator is generally designed to only have a single adjustment manner, and once an adjustment device fails, it is difficult to repair and put into service within a short time. In addition, it is also difficult for the single adjustment manner to meet the requirement of users for manual adjustment in some cases; during the adjustment process of the attenuator, the protective measures for excessive adjustment are relatively weak, and even are not considered, so that certain potential safety hazards exist; and for high-power laser, the absorber generally adopts water cooling heat dissipation, but the absorber is built into the attenuator in the existing design, so waterway connection is complex, and installation and maintenance are inconvenient.

SUMMARY OF THE INVENTION

The purpose of the present invention is to overcome the defects of the prior art and provide a high-power laser attenuator.

To solve the above technical problem, the present invention adopts the following technical solution:

A high-power laser attenuator comprises a housing, an upper cover, a lens barrel, a ½ wave plate, a polarization beam splitting device and a laser absorber assembly. Laser is incident into the housing through the lens barrel, the ½ wave plate and the polarization beam splitting device are arranged in sequence on the incident light path along the laser incident direction, and the laser absorber assembly is arranged in the beam splitting light path of the polarization beam splitting device; an adjusting rod, a motor system and a reversing transmission device are further included; the ½ wave plate is installed in the lens barrel, and generally bonded and fixed on the laser incident end of the lens barrel; the lens barrel and the housing are movably connected, and the lens barrel can rotate around the incident light path; the motor system is installed in the housing, the output shaft of the motor system is arranged perpendicular to the lens barrel and drives the lens barrel through a reversing transmission device to rotate so as to cause the ½ wave plate installed in the lens barrel to rotate, the ½ wave plate changes in the angle of the light axis during rotation, the linearly polarized input laser has different deflections in polarization directions after passing through the ½ wave plate, the proportions of intensity of finally output split light are different after the laser passes through the polarization beam splitting device because the P light component and the S light component of laser in different polarization directions are different, and the attenuation ratio of the input laser can be adjusted by rotating the ½ wave plate to adjust the power of the output laser; and the lens barrel is provided with the adjusting rod and can be rotated by toggling the adjusting rod, and the adjusting rod is used as a handle to manually adjust the rotation position of the ½ wave plate and also as a device for mechanical limit.

Preferably, the lens barrel is movably connected with the housing through the first bearing and the second bearing, and the lens barrel is able to rotate relatively to the housing under the limitation of the two bearings.

Preferably, a snap ring is installed between the lens barrel and the housing, and used to axially locate the lens barrel.

Preferably, the laser incident end of the lens barrel is sheathed with an indicating ring, and the adjusting rod is fixed on the indicating ring; and a scale ring with an empty slot in the middle is fixed on the surface of the housing, and the adjusting rod passes through the empty slot. Because the adjusting rod is restrained to move in the empty slot, the lens barrel can be forced to stopping rotation by obstructing the adjusting rod. The empty slot is matched with the adjusting rod to form mechanical limit preventing excessive adjustment of the attenuator.

The polarization beam splitting device comprises a first lens and a second lens which are placed in sequence on the incident light path along the laser incident direction and placed slantwise opposite to each other, and the normal lines of the incident mirror planes of the two lenses respectively form a Brewster angle with the incident light path; and the laser absorber assembly is arranged in the reflected light path of the first lens.

Preferably, the first lens and the second lens are arranged in mirror symmetry relative to the plane perpendicular to the incident light path.

Preferably, the polarization beam splitting device comprises a first lens and a second lens which are placed in sequence on the incident light path along the laser incident direction and placed slantwise opposite to each other, the normal lines of the incident mirror planes of the two lenses respectively form a Brewster angle with the incident light path, and the laser absorber assembly is arranged in the reflected light path of the first lens. The input laser deflects in the polarization direction after passing through the ½ wave plate, the reflectivities of input laser incident into the first lens in different polarization directions are different, the transmissivities of transmissive laser incident into the second lens again are also different, and the power adjustment of the output laser is achieved by changing the polarization direction of the input laser.

Further preferably, the first lens and the second lens are arranged in mirror symmetry relative to the plane perpendicular to the incident light path, and the incident planes of laser on the two lenses coincide with each other.

Preferably, the laser absorber assembly comprises an absorber and two water swivels, the absorber is installed in the housing, and the water swivels are exposed to the exterior of the housing; and the reflected laser enters the cavity of the absorber to convert light energy into heat energy, and a water cooling unit is connected with the water swivels to make cooling water flow into through the water swivels so as to carry away the heat. The absorber is installed from the exterior of the attenuator, and can be fixed on the attenuator housing through screws or flanges or other connection manners.

Preferably, the reversing transmission device comprises a driving bevel gear and a driven bevel gear which are engaged vertically to achieve 90-degree reversing transmission, the driving bevel gear is connected with the output shaft through a coupling, and the driven bevel gear is sheathed on the lens barrel and fixed to the lens barrel.

As a further preferable solution of the previous solution, the driven bevel gear is provided with a limiting rod, and a trough-type photoelectric switch matched with the limiting rod is installed beside the lens barrel and can adopt a U-slot; when the limiting rod rotates with the lens barrel and the gear to pass through the U-slot of the photoelectric switch, the photoelectric switch is triggered to send a signal; the motor system comprises a motor assembly, a motor driver and an encoder, the output shaft is installed on the motor assembly, the motor driver drives the output shaft to rotate, and the encoder is installed on the motor assembly to monitor the rotational state of the output shaft, and respectively in signal connection with the motor driver and the trough-type photoelectric switch; and the signal sent when the trough-type photoelectric switch is triggered is fed back to the encoder, and the encoder controls the motor driver to stop rotation of the output shaft to achieve photoelectric limit of the attenuator.

The "installation" and "fixation" described in the present invention include manners of direction connection and indirect connection through middle assemblies.

The attenuator provided by instant examples alters the polarization direction of input laser by rotating the ½ wave plate to change the transmissivity of laser incident into the lens at the Brewster angle so that the purpose of energy attenuation of laser energy is achieved. The attenuator of the present invention simultaneously has an electric adjustment manner and a manual adjustment manner, and has photoelectric limit and mechanical limit for the adjustment of the attenuator, and the water swivels for water cooling heat dissipation of the absorber are arranged outside the attenuator housing which results electric and manual adjustment functions of the attenuator simultaneously, enhances the safety protection level of the rotational structure, and simplifies the waterway connection of the absorber, and the absorber can be connected into an external water cooling system conveniently and quickly, which is convenient for installation, replacement and maintenance of the absorber.

Wherein:

1: housing; 2: first lens; 3: second lens; 4: upper cover; 5: first bearing; 6: driving bevel gear; 7: limiting rod; 8: trough-type photoelectric switch; 9: snap ring; 10: ½ wave plate; 11: adjusting rod; 12: second bearing; 13: lens barrel; 14: indicating ring; 15: scale ring; 16: driven bevel gear; 17: coupling; 18: motor assembly; 19: encoder; 20: motor driver; 21: laser absorber assembly; 22: water swivel; L1: input laser; L2: reflected laser; and L3: output laser.

DETAILED DESCRIPTION OF THE INVENTION

The present invention will be further described in detail below in combination with the drawings.

Figure 1:
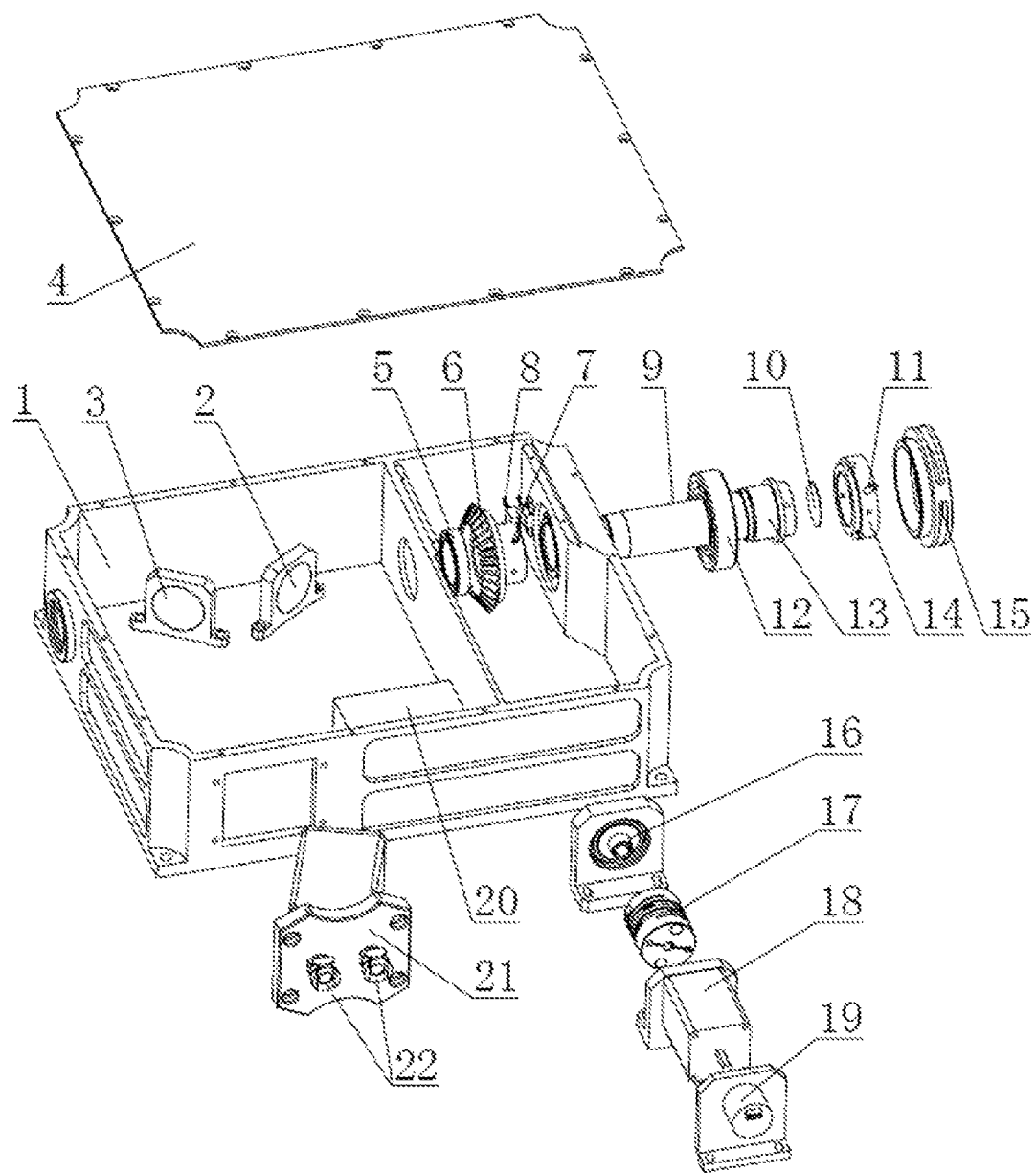
FIG. 1 is an example for an exploded structural diagram of an attenuator of the present invention.
Figure 2:
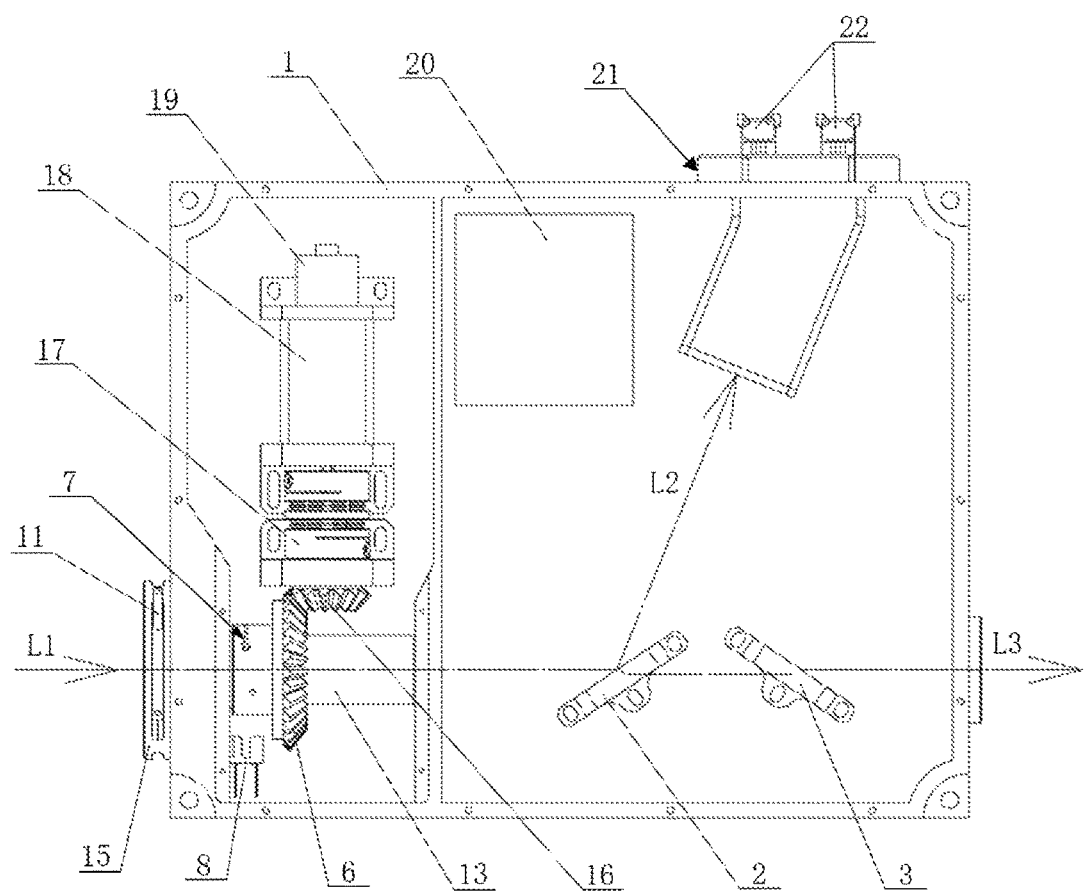
FIG. 2 is a schematic diagram of the integral structure and the light path of the attenuator of FIG. 1.

As shown in FIG. 1, the ½ wave plate 10, the first lens 2, the second lens 3 and the laser absorber assembly 21 which are placed in sequence on the incident light path of the attenuator along the laser incident direction form important nodes on the light path of the attenuator, and the integral structure that the upper cover 4 is removed after the whole attenuator is installed is shown in FIG. 2. Wherein:

The first lens 2 and the second lens 3 are perpendicularly arranged in mirror symmetry relative to the plane perpendicular to the incident light axis, and the normal lines of the incident mirror planes of the two lenses respectively form a Brewster angle with the incident light path; the ½ wave plate 10 is bonded to fixed to the lens barrel 13 near the laser incident end, and the indicating ring 14 is installed near the end of the ½ wave plate 10 in the lens barrel 13; the second bearing 12 and the first bearing 5 are installed and fixed in the corresponding bearing holes of the housing 1, the preassembled lens barrel 13 passes through the second bearing 12, the driven bevel gear 16 and the first bearing 5 in sequence, the lens barrel 13 is fixed to the bearing inner ring, and the driven bevel gear 16 is provided with fixing screws to be fixedly connected with the lens barrel 13; the snap ring 9 is installed in a snap ring slot in the middle of the lens barrel 13 to axially locate the lens barrel 13, and the length of the lens barrel 13 extending into the housing 1 is determined; the scale ring 15 is fixed on the front side of the housing 1 through screws, the adjusting rod 11 is installed and fixed on the indicating ring 14 by passing through the empty slot in the middle of the scale ring 15, and the empty slot and the adjusting rod 11 form a mechanical limiting mechanism for rotation of the lens barrel 13; the motor system is integrally installed in the housing 1, wherein the output shaft of the motor system 18 is connected with the driving bevel gear 6 through the coupling 17 to constitute an electrically driven shaft, and the motor assembly 18 is driven by the motor driver 20 which is installed on the inner bottom of the housing 1; the driving bevel gear 6 and the driven bevel gear 16 form the reversing transmission device, the two gears are mutually engaged, and the intersection angle of gear shafts is 90 degrees to make the electrically driven shaft and the lens barrel 13 arranged vertically, which avoids the influence of the space usage of the electrically driven shaft on the incident light path through reversing transmission; the encoder 19 installed on the motor assembly 18 monitors the rotating position of the output shaft in real time, and the encoder 19 is connected with the motor driver 20 to be capable of sending a signal to control the motor assembly 18 to operate; the driven bevel gear 16 is provided with the limiting rod 7, the gear drives the limiting rod 7 to rotate when rotating, the trough-type photoelectric switch 8 with a U-slot is installed in the corresponding position on the inner wall of the housing 1, the limiting rod 7 triggers the trough-type photoelectric switch 8 to generate a feedback signal when rotating and passing through the U-slot, and the feedback signal of the trough-type photoelectric switch 8 is transmitted to the encoder 19.

The laser absorber assembly 21 is installed from the corresponding open position of the exterior of the housing 1, and firmly fixed through screws, flanges can also be used for connection to keep connection more firm, and the laser absorber assembly 21 comprises an absorber, two water swivels 22 and an end cover; the absorber extends into the housing 1, and is arranged on the reflected light path of the first lens 2 to make the reflected light of input laser on the first lens 2 enter the cavity of the absorber; and the two water swivels 22 are exposed to the exterior of the housing 1, and the external water swivels 22 of the water cooling unit perform water cooling for the absorber.

As shown in FIG. 2, input laser L1 is incident into the attenuator from the lens barrel 13, and reaches the first lens 2 through the ½ wave plate 10 in the lens barrel, reflected laser L2 is absorbed after being incident into the laser absorber assembly 21, and the remaining laser reaches the second lens 3 after transmitted by the first lens 2 and then forms output laser L3 after transmitted by the second lens 3. The linearly polarized input laser L1 deflects in the polarization direction after passing through the ½ wave plate 10, and then is divided into P light component and S light component on the incident plane during incidence into the first lens 2 at the Brewster angle, most of S light forms the reflected laser L2 which is absorbed, and P light is transferred continuously after transmitted with the remaining S light. The transmissivities of P light and S light passing through the first lens 2 and the second lens 3 are fixed, the P light component and the S light component of the input laser L1 in different polarization directions are different, and the adjustment of power of the output laser L3 of the attenuator can be achieved by changing the polarization direction of the input laser L1 by rotating the ½ wave plate 10.

The installation of second lens 3 results in when laser is transmitted by the first lens 2, light spots can deform to a certain extent, and then the laser penetrates through the second lens 3 arranged in mirror symmetry in the propagation direction, which can compensate the deformation of the light spots.

Generally, the output of the attenuator is adjusted electrically, the lens barrel 13 is driven by the motor assembly 18 to rotate to achieve rotation of the ½ wave plate 10, and the trough-type photoelectric switch 8 and the limiting rod 7 form photoelectric limit, the limiting rod 7 triggers the trough-type photoelectric switch 8 to send a feedback signal when rotating and passing through the U-slot, and the encoder 19 controls the motor driver 20 to stop the motor assembly 18 after receiving the feedback signal so as to stop rotation of the ½ wave plate 10; if the photoelectric limit switch fails, the mechanical limit at the adjusting rod 11 ensures rotation to be stopped forcedly; and the lens barrel 13 can be rotated directly by toggling the adjusting rod 11 to achieve manual adjustment of the output of the attenuator.

It shall be understood that the above-mentioned embodiments are only used for describing the technical conception and features of the present invention, and aim to enable those skilled in the field to know the content of the present invention and implement same accordingly, which are not exhaustive specific implementation manners and cannot limit the protection scope of the invention. Any modification or equivalent replacement in accordance with the technical solutions of the present invention without departing from the purpose and the scope of the technical solutions of the present invention shall be covered within the scope of the claims of the present invention.

What is claimed is:

1. A high-power laser attenuator, comprising a housing (1), an upper cover (4), a lens barrel (13), a ½ wave plate (10), a polarization beam splitting device and a laser absorber assembly (21), wherein laser is incident into the housing (1) through the lens barrel (13), the ½ wave plate (10) and the polarization beam splitting device are arranged in sequence on an incident light path along a laser incident direction, and the laser absorber assembly (21) is arranged in a beam splitting light path of the polarization beam splitting device, characterized by further comprising:
an adjusting rod (11), a motor system and a reversing transmission device;
wherein the ½ wave plate (10) is installed in the lens barrel (13); the lens barrel (13) and the housing (1) are movably connected, and the lens barrel (13) can rotate around the incident light path; the motor system is installed in the housing (1), and an output shaft of the motor system is arranged perpendicular to the lens barrel (13) and drives the lens barrel (13) to rotate through a reversing transmission device; and the lens barrel (13) is provided with the adjusting rod (11), and can be rotated by toggling the adjusting rod (11);
wherein the laser absorber assembly (21) comprises an absorber and two water swivels (22), the absorber is installed in the housing (1), and the water swivels (22) are exposed to the exterior of the housing (1).

2. The high-power laser attenuator according to claim 1, characterized in that: the lens barrel (13) is movably connected with the housing (1) through a first bearing (5) and a second bearing (12).

3. The high-power laser attenuator according to claim 1, characterized in that: a snap spring (9) is installed between the lens barrel (13) and the housing (1), and used to axially locate the lens barrel (13).

4. The high-power laser attenuator according to claim 1, characterized in that: a laser incident end of the lens barrel (13) is sheathed with an indicating ring (14), and the adjusting rod (11) is fixed on the indicating ring (14); and a scale ring (15) with an empty slot in the middle is fixed on the surface of the housing (1), and the adjusting rod (11) passes through the empty slot.

5. The high-power laser attenuator according to claim 1, characterized in that: the polarization beam splitting device comprises a first lens (2) and a second lens (3) which are placed in sequence on the incident light path along the laser incident direction and placed slantwise opposite to each other, and normal lines of incident mirror planes of the two lenses respectively form a Brewster angle with the incident light path; and the laser absorber assembly (21) is arranged in a reflected light path of the first lens (2).

6. The high-power laser attenuator according to claim 1, characterized in that: the first lens (2) and the second lens (3) are arranged in mirror symmetry relative to the plane perpendicular to the incident light path.

7. The high-power laser attenuator according to claim 1, characterized in that: the reversing transmission device comprises a driving bevel gear (6) and a driven bevel gear (16) which are engaged perpendicularly, the driving bevel gear (6) is connected with the output shaft through a coupling (17), and the driven bevel gear (16) is sheathed on the lens barrel (13) and fixed to the lens barrel (13).

8. The high-power laser attenuator according to claim 7, characterized in that: the driven bevel gear (16) is provided with a limiting rod (7), and a trough-type photoelectric switch (8) matched with the limiting rod (7) is installed beside the lens barrel (13);
the motor system comprises a motor assembly (18), a motor driver (20) and an encoder (19), the output shaft is installed on the motor assembly (18), the motor driver (20) drives the output shaft to rotate, and the encoder (19) is installed on the motor assembly (18) to monitor the rotational state of the output shaft, and respectively in signal connection with the motor driver (20) and the trough-type photoelectric switch (8).

* * * * *